(12) United States Patent
Zhang et al.

(10) Patent No.: US 7,502,348 B2
(45) Date of Patent: Mar. 10, 2009

(54) SILENT PROACTIVE HANDOFF

(75) Inventors: Tao Zhang, Fort Lee, NJ (US); Raziq Yaqub, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 219 days.

(21) Appl. No.: 11/096,721

(22) Filed: Apr. 1, 2005

(65) Prior Publication Data
US 2006/0221900 A1    Oct. 5, 2006

(51) Int. Cl.
*H04Q 7/00* (2006.01)

(52) U.S. Cl. ............... 370/331; 370/235; 370/332; 370/335; 370/341; 455/436; 455/432.1; 455/525

(58) Field of Classification Search ............ 370/331, 370/235, 332, 335, 338, 341; 455/436, 432.1, 455/437, 438, 439, 440, 442, 443, 444, 525; 375/219

See application file for complete search history.

(56) References Cited

U.S. PATENT DOCUMENTS

| | | | |
|---|---|---|---|
| 5,870,675 A * | 2/1999 | Tuutijarvi et al. ........... 455/436 |
| 6,018,661 A * | 1/2000 | Raith et al. .................. 455/437 |
| 6,112,082 A * | 8/2000 | Almgren et al. ............. 455/425 |
| 6,438,376 B1 * | 8/2002 | Elliott et al. ................ 455/437 |
| 7,215,958 B2 * | 5/2007 | Kovacs et al. ............... 455/436 |
| 2002/0141360 A1 * | 10/2002 | Baba et al. ................... 370/331 |
| 2004/0028009 A1 * | 2/2004 | Dorenbosch et al. ........ 370/329 |
| 2004/0224711 A1 * | 11/2004 | Panchal et al. .............. 455/518 |
| 2005/0036462 A1 * | 2/2005 | Sillasto et al. .............. 370/331 |
| 2006/0085552 A1 * | 4/2006 | Sollenberger et al. ....... 709/232 |
| 2006/0099950 A1 * | 5/2006 | Klein et al. ................. 455/439 |

* cited by examiner

*Primary Examiner*—Matthew D Anderson
*Assistant Examiner*—Shaima Q Aminzay
(74) *Attorney, Agent, or Firm*—Watchstone P+D, PLC; Stephen B. Parker (57) ABSTRACT

In some embodiments, a silent proactive handoff is performed wherein a mobile device that is using a current network to transport its application traffic uses its silent periods to connect to at least one target network temporarily and uses this temporary connectivity to perform actions needed for handoff into the target network. Among other things, with such a silent proactive handoff approach, e.g., if handoff actions to a target network fail during silent periods, there can still be essentially no impact on the applications.

21 Claims, 5 Drawing Sheets

SILENT PROACTIVE HANDOFF

BACKGROUND

1. Field of the Invention

The present application relates to wireless networking and, in some preferred embodiments, to methods of improving handoff of a mobile device between neighboring networks and/or the like.

2. General Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that identifies the host device's point of attachment to the IP networks.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer. The layers of the OSI model are listed below.

Layer 7 (i.e., the application layer) is a layer at which, e.g., communication partners are identified, quality of service is identified, user authentication and privacy are considered, constraints on data syntax are identified, etc.

Layer 6 (i.e., the presentation layer) is a layer that, e.g., converts incoming and outgoing data from one presentation format to another, etc.

Layer 5 (i.e., the session layer) is a layer that, e.g., sets up, coordinates, and terminates conversations, exchanges and dialogs between the applications, etc.

Layer-4 (i.e., the transport layer) is a layer that, e.g., manages end-to-end control and error-checking, etc.

Layer-3 (i.e., the network layer) is a layer that, e.g., handles routing and forwarding, etc.

Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery.

Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as, e.g., layers including the network layer or layer-3 in the OSI model and the like) are referred to as the higher-layers.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two or more independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Handoffs of Mobile Devices

In the context of, for example, a mobile device with an IP-based wireless network interface (such as, e.g., an IEEE 802.11 or an 802.16 interface), the mobile device needs to perform roaming or handoffs when it moves from one network into another network. With existing handoff methodologies, handoff is typically accomplished by performing the following sequence of protocol layer specific handoffs:

First, handoff takes place at the physical layer. In this regard, the mobile device switches its radio channel to, e.g., a wireless base station or wireless access point in the target network.

Second, handoff takes place at layer-2. In this regard, the mobile device switches its layer-2 (i.e., link-layer) connections to the target network. As explained above, the link layer or layer-2 refers to the protocol immediately below the IP-layer that carries user traffic. The mobile device performs layer-2 authentication with the target network if the target network requires such authentication.

Third, handoff takes place at the IP-layer. In this regard, the mobile device obtains a local IP address from the target network, performs IP-layer authentication if required by the target network, and then performs IP-layer location update so that IP packets destined to the mobile device can be routed by the IP network to the mobile device via the target network. In some instances, one way to support IP layer location update is to use Mobile IP defined by the Internet Engineering Task Force (IETF).

Forth, handoff takes place at the application-layer. The mobile device performs necessary steps at the application layer to ensure that its application traffic will flow correctly to the applications on the mobile device via the target network. For example, when the mobile device uses the Session Initiation Protocol (SIP) defined by the IETF to manage its application-layer signaling, an application layer handoff can be achieved by the mobile device updating its current location with its home SIP server. The mobile device may also need to carry out application-layer authentication with the target network if required by the target network. This is the case, for example, when the mobile device is using the IP Multimedia Subsystem (IMS) in a visited 3GPP ($3^{rd}$ Generation Partnership Project) wireless network, where the IMS is a SIP-based system supporting application-layer signaling and management for multimedia applications over 3GPP networks.

Sometimes, either IP-layer handoff or application-layer handoff is sufficient. That is, it may be unnecessary to perform both IP-layer and application-layer handoff. These existing methods can lead to significant handoff delays when they are used in IP-based wireless networks. For example, in a geographical region where there are many wireless local area networks (WLANs) such as in cities, inside building complexes or residential homes, or in other public places where multiple wireless LANs exist, a mobile device may receive strong radio signals from multiple radio networks at the same time. However, the mobile device may not be authorized to use some of these radio networks.

Under the existing handoff methods described above, a mobile device will select a target network based on, for example, radio signal strengths, and will go through the steps described above to connect to the target network and then discover, for example, if it is authorized to use the network or if the network does not provide the capabilities (e.g., sufficient available bandwidth) or the services that the mobile device needs. Consequently, the mobile device will have to try to connect to another network, and will repeat this process until it finally connects to a network that provides and that allows it to use the capabilities and services it needs (or until it has exhausted all possible networks). Accordingly, with existing systems, a handoff can take a long time that can be intolerable and can delay sensitive applications such as, as some examples, live voice and/or video applications.

While a variety of systems and methods are known, there remains a need for improved systems and methods for performing handoffs in wireless networks.

SUMMARY OF THE PREFERRED EMBODIMENTS

The preferred embodiments of the present invention can significantly improve upon existing systems and methods for performing handoffs in wireless networks.

In some embodiments, a silent proactive handoff is performed wherein a mobile device that is using a current network to transport its application traffic uses its silent periods to connect to at least one target network temporarily and uses this temporary connectivity to perform actions needed for handoff into the target network. Among other things, with such a silent proactive handoff approach, e.g., if handoff actions to a target network fail during silent periods, there can still be essentially no impact on the applications.

According to some preferred embodiments, a method for performing silent proactive handoff of a mobile device to a target network while the mobile device is using a current network is performed that includes: while the mobile device is using the current network to transport application traffic and the current network satisfies the mobile device's requirements, having the mobile device use at least one silent period to temporarily connect to at least one target network to proactively perform at least one handoff action for potential later handoff to the target network.

Preferably, the method further includes that the mobile device sends or receives substantially no traffic over the current access network during the at least one silent period. In addition, the method preferably includes having the mobile device use the at least one silent period to connect to the target network so that the mobile device receives advertisement messages from the target network. In some embodiments, the method further includes having the mobile device use the at least one silent period to establish a layer-2 connection or association with the target network for receiving IP-layer or high layer advertisements from the target network. In some embodiments, the method includes having the mobile device use the at least one silent period to perform layer-2, layer-3 or application layer authentication with the target network. Preferably, the method includes having the mobile device perform the following handoff actions during the at least one silent period: a) discovering neighboring network information; b) obtaining a local IP address from the target network; and c) performing authentication with the target network.

In some other embodiments, the method includes having the mobile device determine if the at least one silent period is sufficient to complete one or more handoff action. For example, the method may include having the mobile device determine if the at least one silent period is sufficient to complete one or more handoff action by comparison to a pre-set or a dynamically determined threshold.

In some preferred embodiments, the method further includes having the mobile device predict an actionable silent period based on monitoring of time periods and a prediction model. In some examples, the method includes dynamically estimating at least one actionable silent period threshold for at least one handoff action based on previous times the mobile device took to perform handoff actions, using the at least one threshold and inter-packet times determined from a traffic monitor to detect a next silent period, to predict if this next silent period will be an actionable silent period, and to predict a length of the next actionable silent period.

In some preferred embodiments, the method further includes having the mobile device select a target network to which the mobile may switch to. Preferably, the method includes when a target network is selected and an actionable silent period is detected, switching the mobile device's layer-2 connection to the target network. In some embodiments, the method includes having the mobile device connect successfully to the target network and before a current actionable silent period expires, having the mobile device enter an information discovery phase to listen to the target network's advertisement messages to learn information needed to perform handoffs at different protocol layers to the target network, and if the current actionable silent period has not expired after the information discovery phase, having the mobile device start at least one handoff action.

In some embodiments, the method includes after having the mobile device start the at least one handoff action, in the event that the current network continues to satisfy the mobile device's requirements, having the mobile device switch its network connection back to the current network. In some embodiments, the method includes after having the mobile device start the at least one handoff action, in the event that the current network does not continue to satisfy the mobile device's requirements, having the mobile device perform the remaining handoff steps to finish a handoff. In some embodiments, the method includes having the mobile device make a determination as to whether to utilize a silent proactive handoff based on an estimation of the time that the mobile device will be within a candidate network. In some exemplary embodiments, the method further includes having the mobile device make the determination based on one or more of the following parameters: types of user applications; relative speed at which the mobile device is moving; and a predicted size of a candidate network.

According to some other embodiments of the invention, a mobile device having silent proactive handoff capability is provided that includes: a traffic monitor component configured to monitor time periods between packets transmitted to or from the mobile device over a current access network; a target network selector component configured to select a target network to which the mobile device may potentially switch to; a silence predictor component configured to predict an actionable silence period; and a silent handoff controller configured to control a silent proactive handoff to a target network during the actionable silent period. Preferably, the silent handoff controller is configured to establish connections to a target network, to discover network information about a target network, to obtain a local IP address for the mobile device from the target network, and to perform authentication with the target network.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

According to the preferred embodiments of the invention, a new approach is used to significantly reduce the handoff delays, which approach is referred to herein as Silent Proactive Handoff (SPH). In some preferred embodiments, a silent proactive handoff operates as follows: when a mobile is using one network (referred to as the old network or the current network) to transport its application traffic and this network can satisfy the mobile device's requirements, the mobile device uses its silent periods to connect to one or more target neighboring network(s) temporarily (i.e., only during these silent periods) and uses this temporary connectivity to perform actions needed for handoff into the target network.

In the preferred embodiments, a silent period is a time period during which the mobile has no traffic to send or receive over the current access network. In some embodiments, a silent period can be defined as a time period during which the mobile has substantially no traffic to send or receive. In preferred embodiments, during a silent period, a mobile device would not be expecting incoming traffic at the IP and higher protocol layers. Moreover, in preferred embodiments, the mobile device will not control if and/or when there may be incoming traffic, but the mobile device will predict or estimate silent periods. Thus, in preferred embodiments, a silent period is a time period during which the mobile device does not need to send or receive IP or higher layer traffic (e.g., not just application layer traffic). In some instances, the mobile device may send traffic at protocol layers below the IP layer during a silent period. In addition, in some examples, a silent period can include time periods during which the mobile device may send or receive only certain IP layer or higher layer traffic (such as, e.g., application layer traffic) which, when temporarily interrupted (e.g., delayed or discarded), will substantially not cause undesirable or unexpected effects to the user of a mobile device.

When a mobile device is inside overlapping radio coverage areas of multiple radio networks, existing network interface cards can receive radio beacons from these radio networks simultaneously. These radio beacons, however, do not provide IP or higher layer information, such as, e.g., IP addresses of the access IP routers, IP address allocation servers (e.g., DHCP servers), or authentication servers inside a target network, and do not provide the necessary IP and higher layer parameter values necessary to connect to or authenticate with a target network.

According to preferred embodiments, with a novel silent proactive handoff approach, the mobile device uses the silent periods to connect to a target network so that the mobile device can receive, e.g., IP-layer and/or high layer advertisement messages from the target network. Since these advertisement packets are typically broadcast over the local IP sub-networks, receiving these advertisement packets from a target network generally does not require the mobile device to obtain a local IP address from the target network.

Depending on the specific types of the radio networks, the mobile device may need to establish a layer-2 connection or an association to the target network for receiving IP-layer or high layer advertisements from the target network. In some embodiments, establishing a layer-2 connection to a target network may require the mobile device to perform layer-2 authentication with the target network if the target network implements layer-2 authentication mechanisms.

In this disclosure, the terminology "connected to a target network" refers to the establishment of the necessary connection or association with a target network to the extent that the mobile can receive IP-layer and/or high layer advertisement messages. Once connected to a target network, the mobile can perform a range of actions during the silent period that need to be done during an actual handoff. In some embodiments, these actions can include some or all of the following:

Neighboring network information discovery: This may be done to discover the information needed by the mobile to handoff into the neighboring network. To do so, the mobile device can listen to advertisements at layer-2, the IP-layer and/or the application layer from the target network to obtain information regarding the target network. This information may include, e.g., the addresses of the access IP routers, addresses of the IP address allocation servers (e.g., Dynamic Host Configuration Protocol (DHCP) servers), addresses of the authentication routers, and other parameter values needed to perform authentication with the target network.

Obtain local IP address from the target network: This may be done to obtain a local IP address from the target network that the mobile can use to receive from IP packets from the target network.

Perform authentication with the target network: This may be done to perform layer-2, layer-3, and/or application-layer authentication with the target network if the target network requires such authentication(s).

In this disclosure, among other actions, the foregoing actions and the action to establish a connection to a target network as are referred to as types of Handoff Actions.

In some instances, a silent period may be too short for the mobile device to perform one or more, or any, handoff action. In this disclosure, an Actionable Silent Period (ASP) is defined as a silent period that is long enough for the completion of one or more handoff action(s).

The mobile device may use any existing or new approaches to determine whether a silent period is expected to be an ASP. For example, a mobile can treat a silent period as an ASP if the silent period is expected to be longer than a pre-set (e.g., pre-configured) or dynamically determined threshold. This threshold, referred to as an ASP Threshold, can be different for different handoff actions.

In some embodiments, a dynamic threshold may be determined based on the times the mobile device took in the recent past to perform handoff actions. For example, a statistical model can be used to model the time series of the times the mobile took to perform handoff actions in the recent past and to estimate the minimum length of time needed to perform a handoff action. This minimum time period can then be used as a dynamically determined threshold to determine whether a silent period will be an ASP.

Figure 1:
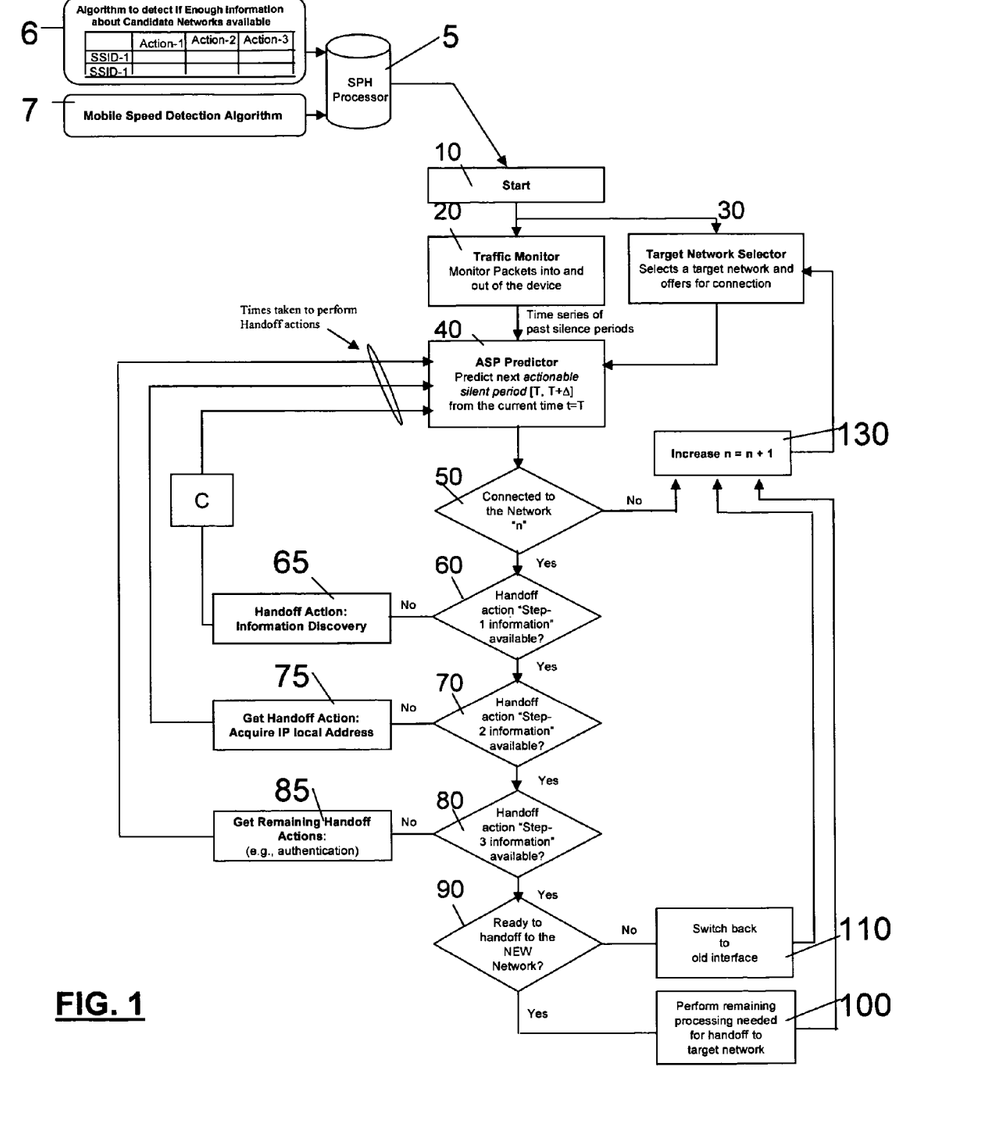
FIG. 1 is a flow diagram illustrating some steps of an exemplary embodiment of a silent proactive handoff approach according to some embodiments of the present invention.

FIG. 1 illustrates some illustrative basic process steps that may be performed in some exemplary embodiments of the invention employing a silent proactive handoff approach. While FIG. 1 illustrates some preferred process steps, it should be appreciated by those in the art based on this disclosure that the process steps shown in FIG. 1 are illustrative in nature and various embodiments of the invention may employ alternative process steps, etc.

With reference to the embodiment shown in FIG. 1, the mobile device can include a functional component referred to herein as a silent proactive handoff processor (SPH Processor) 5, which can, e.g., be configured to perform processing functions of the silent proactive handoff methodologies. In addition, the mobile device can also include a component 6 that includes an algorithm or process to detect if enough information about a candidate network is available, as well as a component 7 that includes a mobile speed detection algorithm or process.

FIG. 1 shows some preferred process steps once an SPH processor 5 or the like initiates the silent proactive handoff process at step 10.

In the preferred embodiments, the mobile device has a functional component referred to in this disclosure as a Traffic Monitor that is configured to monitor the time periods between packets (e.g., inter-packet times) entering and/or leaving the mobile device over the current access network (i.e., the network the mobile uses currently to transport its application traffic), such as shown at step 20 in FIG. 1.

In the preferred embodiments, the mobile device also includes a functional component called an ASP Predictor that uses the output from the Traffic Monitor and a prediction model to detect the next ASP and to predict its length, such as, e.g., shown at step 40 in FIG. 1. While a variety of known prediction models may be used (as would be understood by those in the art based on this disclosure), some non-limiting examples of illustrative prediction models can include Wiener Process models and/or time series models, such as, e.g., auto-regression models.

Figure 2:
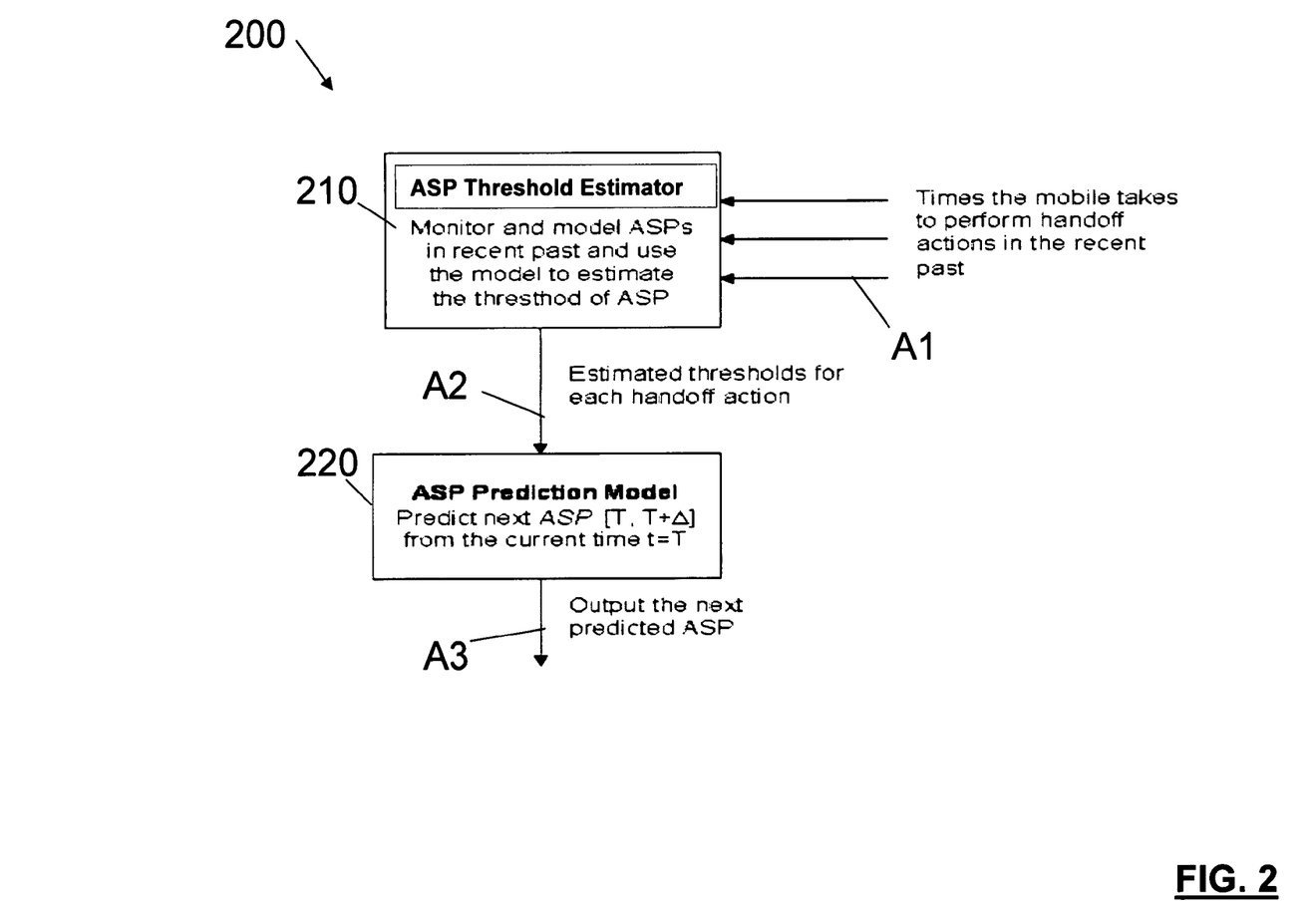
FIG. 2 is a schematic diagram depicting the structure of an actionable silent period predictor according to some embodiments of the present invention.

In some embodiments, the ASP Predictor can dynamically estimate the ASP thresholds based on the times the mobile took to perform handoff actions in the recent past. To dynamically estimate the ASP thresholds, in some embodiments, the ASP Predictor includes components as depicted in FIG. 2. In this regard, according to the embodiment shown in FIG. 2, an ASP Predictor 200 includes an ASP Threshold Estimator 210 and an ASP Prediction Model 220 as shown. In some embodiments, the ASP Threshold Estimator 210 receives as input the times the mobile device took to perform prior handoff actions (such as, e.g., handoff actions within the recent past) as schematically shown as inputs at arrows A1 in FIG. 2. In some preferred embodiments, the ASP Threshold Estimator 210 can then use any appropriate means (as would be understood by those in the art based on this disclosure), such as statistical models, to estimate the minimum time it has recently taken the mobile to perform each handoff action and use it as the ASP threshold for each handoff action.

In the preferred embodiments, the estimated ASP thresholds can then be transmitted to the ASP Prediction Model 220, such as, e.g., shown at arrow A2 in FIG. 2. Then, the ASP Prediction Model 220 can use these thresholds and the inter-packet times from the Traffic Monitor (see, e.g., step 20 in FIG. 1) to detect the next silent period (such as, e.g., [T, T+$\Delta$] from the current time t=T), to predict if this next silent period will be an ASP, and to predict the length of the next ASP, such as, e.g., depicted at 220 in FIG. 2 and at 40 in FIG. 1. As shown at A3 in FIG. 2, the ASP Prediction Model 220 preferably outputs a next predicted ASP. Then, the mobile device or the SPH processor can preferably use this information to control silent proactive handoff during such a next ASP period.

As also shown in FIG. 1, the mobile device also preferably includes a functional component referred to in this disclosure as a Target Network Selector that selects a target network to which the mobile device may switch to, such as, e.g., shown at step 30 in FIG. 1. In some preferred embodiments, as shown in FIG. 1, the target network selector operates in parallel to the traffic monitor. In various embodiments, the target network selection can be based on any criteria deemed appropriate to satisfy the requirements of the mobile device and the applications running on the mobile device. These criteria may include, for example, the detection of a new radio network, when the radio signal strength of the current network drops to a threshold.

In the preferred embodiments, when a target network is selected and an actionable silent period is detected, the mobile device switches its radio connection and layer-2 connection to the target network. If it fails to establish a connection to the target network (e.g., if its layer-2 authentication fails), the target network selector is preferably notified. At that time, the target network selector will then preferably proceed to select a new target network. In some embodiments, as shown in FIG. 1, if at step 50 the mobile device fails to establish a connection, then an algorithm can be employed, such as, e.g., shown at 130 that increments a network identification value from, for example, "n" to a network identification value of "n=n+1". However, it should be appreciated that such an algorithm can be omitted as long as, for example, the target network selector can proceed to select another network.

In the preferred embodiments, after the mobile device connects successfully to the target network, and proceeds through step 50, and if the current ASP has not yet expired, the mobile device enters the information discovery phase at step 60 to listen to the target network's layer-2, IP-layer, and/or application-layer advertisement messages to learn about the necessary information needed to perform handoffs at different protocol layers to the target network. Preferably, if the mobile device has already acquired the information it needed about the target network, it will pass through or skip this information discovery phase (referred to as Step 1 in FIG. 1)

and go directly to the next step 70 as shown in FIG. 1. On the other hand, if the mobile device has not already acquired the information, it will proceed to enter the information discovery phase at step 65.

In the illustrated embodiment, after passing through this step 65 (and, in particular, if the ASP period terminates), the process may move to the ASP Predictor in order to predict a net actionable silent period back at step 40 shown in FIG. 1. Then, upon prediction of an appropriate ASP (which, e.g., may be predicted in some embodiments based on the handoff action to be achieved), the system may again continue downward along the process steps as discussed above.

In some embodiments, as described further below, a counter C can be employed in order to evaluate the number of times the process moves around the loop from step 40, to step 50, to step 60, to step 65 and through the counter back to step 40. Among other things, a counter C can help to identify if the system is having difficulty achieving a certain handoff action, such as, e.g., an initial information discovery handoff action.

Preferably, if the current ASP does not expire after the information discovery phase, the mobile device starts a second handoff action, such as, for example, to obtain a local IP address from the target network (referred to as Step 2 in FIG. 1). In this regard, a local IP address from a target network may be an IP address the mobile can use to receive, e.g., unicast packets from the target network. Preferably, if the mobile already has a local IP address from this target network, the mobile will go directly to the next step as shown FIG. 1 at step 70. On the other hand, if the mobile device has not already acquired the information, it will proceed to enter this Step 2 handoff action phase at step 75.

In the illustrated embodiment, after passing through this step 75 (and, in particular, if the ASP period terminates), the process may move to the ASP Predictor in order to predict a net actionable silent period back at step 40 shown in FIG. 1. Then, upon prediction of an appropriate ASP (which, e.g., may be predicted in some embodiments based on the handoff action to be achieved), the system may again continue downward along the process steps as discussed above.

Preferably, if the current ASP does not expire after the mobile device moves through a particular handoff action, such as, e.g., a Step 1 or a Step 2 handoff action, the system will start to perform a next or new handoff action. For example, if the current ASP does not expire after the mobile device moves through the Step 2 handoff action and acquires and configures itself with a local IP address from the target network, it will preferably start to perform a new handoff action (referred to as Step 3 in FIG. 1), such as, e.g., to perform the necessary authentication at the IP and application layers with the target network if these authentications are required by the target network, such as, e.g., shown at step 80 in FIG. 1. Preferably, if the mobile already authenticated with or does not require authentication with this target network, the mobile device will go directly to the next step as shown FIG. 1 at step 90. On the other hand, if the mobile device has not already acquired the authentication information, it will proceed to enter this Step 3 handoff action phase at step 85.

In the illustrated embodiment, after passing through this step 85 (and, in particular, if the ASP period terminates), the process may return to the ASP Predictor in order to predict a next actionable silent period back at step 40 shown in FIG. 1. Then, upon prediction of an appropriate ASP (which, e.g., may be predicted in some embodiments based on the handoff action to be achieved), the system may again continue downward along the process steps as discussed above.

Preferably, if the authentications fail (such as, e.g., indicating that the mobile may not be allowed to use the target network), the target network selector is so notified and the target network selector will start the selection of a new target network.

If after finishing some or all of the above steps, the mobile device is still not yet ready to handoff into the target network at step 90 (e.g., if the current network continues to satisfy the mobile's requirements), the mobile device will preferably switch its network connection back to the current network (i.e., the old network), such as, e.g., shown at step 110 in FIG. 1.

Since the above process of switching to the target network and then switching back to the current or old network can be advantageously done during the otherwise silent periods of the mobile device, the switching can be effectively transparent to the applications on the mobile device and, hence, will avoid interruptions to such applications.

Figure 3:
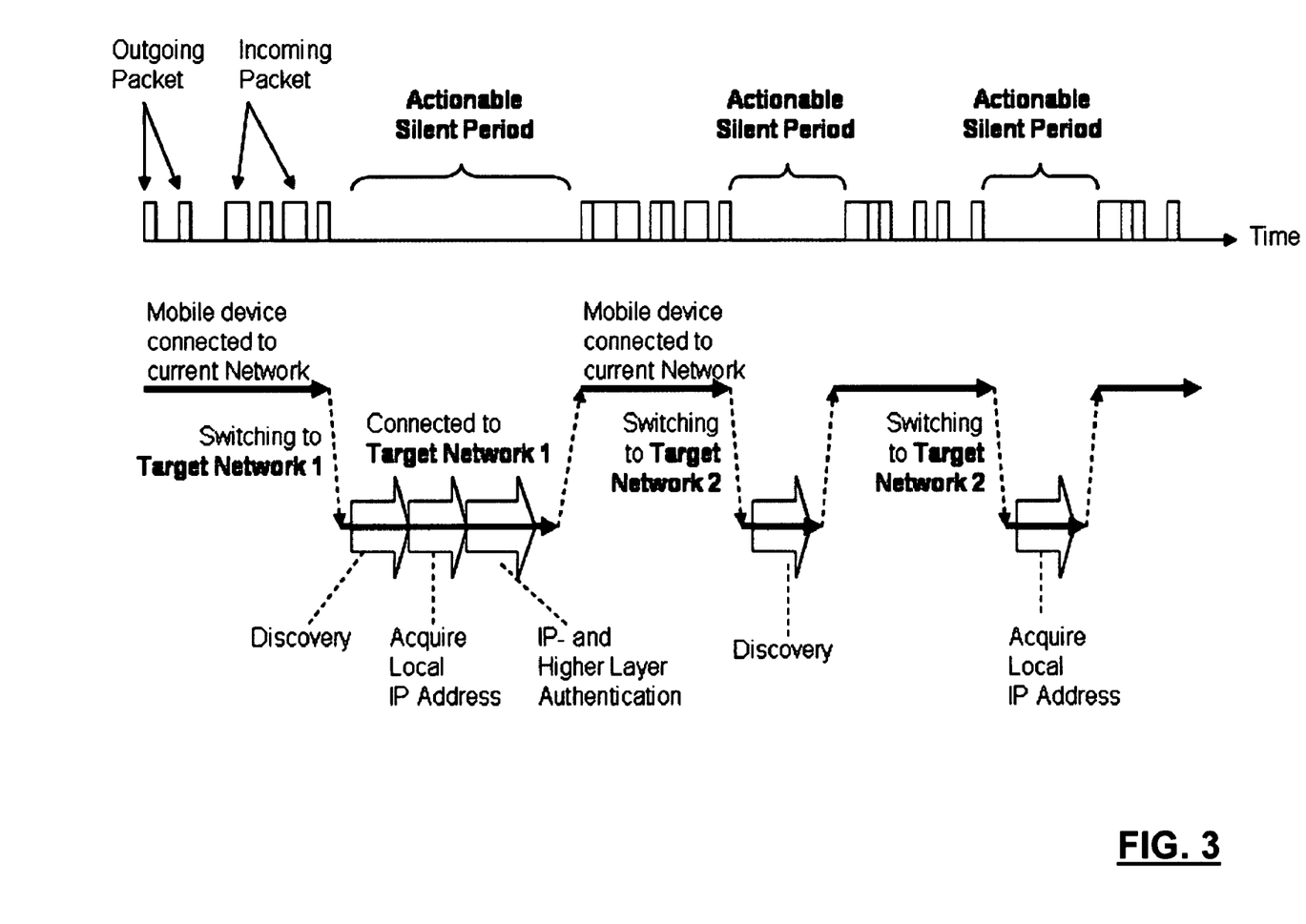
FIG. 3 is a schematic diagram demonstrating the use of silent periods for network discovery and for performing proactive handoff actions.

Reference is now made to FIG. 3 which schematically illustrates the use of silent periods for network discovery and for performing proactive handoff actions according to some preferred embodiments. As shown in FIG. 3, if during one ASP, the mobile device was only able to perform one or a subset of the handoff actions, the mobile device can use subsequent ASPs to perform the remaining handoff actions needed for the target network. In this manner, multiple ASPs can be utilized that are not concurrent in time in some embodiments. For example, during one ASP, the mobile device can discover the necessary information regarding a target network (e.g., addresses of the IP access router, the IP address allocation server, and the authentication server). And, for example, during another subsequent ASP (such as, e.g., a next ASP), the mobile device can obtain a local IP address from the target network and/or can perform IP or application-layer authentication with the target network.

Preferably, if the mobile device becomes ready for an actual handoff into the target network (such as, e.g., when the radio signal strength of the old network has degraded below a threshold), the mobile device can proceed to perform the rest of the handoff steps needed to finish the actual handoff, such as, e.g., shown at step 100 in FIG. 1. In some preferred embodiments, the mobile device will proceed to perform the rest of the needed handoff steps to finish the actual handoff without having to switch back to the old/current interface.

In some preferred embodiments, after each successful handoff action, the time the mobile device took to perform the handoff action is passed on to the ASP Predictor, which can be later used by the ASP Predictor to estimate a threshold used to determine dynamically whether a silent period is an ASP.

Preferably, the mobile device can repeat the process steps (such as, e.g., process steps depicted in FIG. 3) for multiple radio networks. Preferably, at any given time, the mobile device can have one or more (e.g., multiple) target network(s) with which the mobile has completed one or more handoff actions.

As should be understood based on this disclosure, the present silent proactive handoff approach has significant advantages. For example, with the silent proactive handoff approach, if handoff actions to a target network fail during silent periods for any reason (e.g., the user is not authorized to use the target network), there can be essentially no impact on the applications.

In some instances, a mobile device may traverse a network too quickly for the network to be of any practical use for the mobile device user. For example, a vehicle traveling at 75 miles-per-hour may traverse a wireless LAN within about 5 seconds when the wireless LAN has a coverage area of about 150 meters. In such an illustrative case, the mobile device may receive no benefit by handing off into this wireless LAN when, for example, the user application is voice and/or the like. Therefore, there would be no need for the mobile device to perform such silent proactive handoff actions for this wireless LAN.

Accordingly, in some preferred embodiments, a mobile device is configured to determine when silent proactive handoff may not be needed. Accordingly, in this manner, the mobile device can be adapted to stop the silent proactive handoff for networks for which silent proactive handoff is not appropriate. Among other things, stopping the silent proactive handoff when it relates to a network that does not provide any benefit to the user can help to reduce unnecessary battery consumption, unnecessary use of processing power, etc.

In some preferred embodiments, a software process, referred to in this disclosure as a Silent Proactive Handoff Activator (SPH Activator), is implemented on the mobile device to dynamically determine when to activate or deactivate the silent proactive handoff. In some illustrative embodiments, some illustrative ways to decide whether to run silent proactive handoff can be to use one or more of the following parameters:

1). types of user applications, such as, e.g., voice, data, video, etc.;
2). relative speed at which the mobile device is moving; and
3). predicted size (e.g., diameter) of the candidate network(s).

In some illustrative embodiments, the SPH Activator can use some or all of the above parameters (and/or any other appropriate parameters as would be apparent to those in the art based on this disclosure) to estimate the time it will take for the mobile device to traverse a candidate network. Preferably, if the estimated traversal time is lower than a threshold level $\Phi$ that represents the minimum amount of time a mobile device has to stay inside a network for the network to be useful for the user's applications, the SPH Activator stops the silent proactive handoff. On the other hand, if the estimated network traversal time is higher than the threshold level $\Phi$, then the SPH Activator can preferably enable and/or start the silent proactive handoff.

To estimate the time it takes a mobile device to traverse a network, the mobile device can, in some instances, estimate its moving speed and direction. In some embodiments, a mobile device's moving speed and direction can be estimated using one or more of the following methods:

1). The amount of time that the mobile device took to traverse similar types of networks in the recent past can be recorded. For example, IEEE 802.11 networks have similar coverage ranges. Therefore, the mobile device can estimate the time it will spend in the next 802.11 network based on the times it spent in other 802.11 networks in the recent past. For example, if the predicted resident time is shorter than a threshold level $\Phi$, the mobile can stop the silent proactive handoff for the next 802.11 network.

2). A counter C can be evaluated. In this regard, in some exemplary embodiments, as discussed briefly above, if the value of a counter reaches reasonably high in a fairly short interval of time without gathering even the first handoff action information, that can potentially demonstrate, among other things, that the mobile device is moving at fairly high speed and the silent proactive handoff algorithm may be stopped for some duration to save the battery power. In some embodiments, the value of this counter C could be hard fixed or may change dynamically based on some mathematical model. For example, a statistical or an exponential model could be used to model the instances that the mobile device tried but failed to get the first handoff action information in the recent past and could use this to estimate the minimum length of time on the mobile device to determine when to re-activate the SPH. By way of example, in some illustrative embodiments, a counter C could be procedurally located at the component C as shown in FIG. 1.

3). The MAC (Media Access Control) layer signals in most radio networks allow a mobile to determine when it will receive the next radio beacon from a certain network. For example, an IEEE 802.11 Basic Service Set (BSS), which is a set of Access Points that form a local area wireless network, typically sends beacons in 100 ms intervals. If the mobile receives all the consecutive beacon signals at regular time intervals, such as for example at $(100.+\Delta T)$ ms where $\Delta T$ is the beacon transmission time from an access point to the mobile, it indicates that the mobile device is stationary when $\Delta T$ is a constant. On the other hand, if $\Delta T$ is decreasing, it means the mobile is traveling in the direction of the AP from which the radio beacon is received. On yet the other hand, if $\Delta T$ is increasing, it means the mobile is going away from that access point that is sending the beacons. Thus, in some embodiments, the rate at which $\Delta T$ increases or decreases can therefore be the predictor of the mobile device's speed as well as its direction. Thus, in some embodiments, using the mobile device's estimated moving speed and the estimated coverage range of a network, the mobile device can estimate the time it will take to go through the network.

In some embodiments, the foregoing predictor can also be used to down select the candidate networks. In particular, networks that the mobile device is moving closer to can receive higher preference than networks that the mobile device is moving farther away from, when the mobile device decides which candidate networks to select to perform proactive handoff processing.

In some embodiments, a decision to stop or to continue to run the ASP algorithm can also be made if the gathered information about the candidate networks is sufficient. That is, if the information collected about the available networks is already enough, in some embodiments, the algorithm can be stopped from gathering further information.

Figure 4:
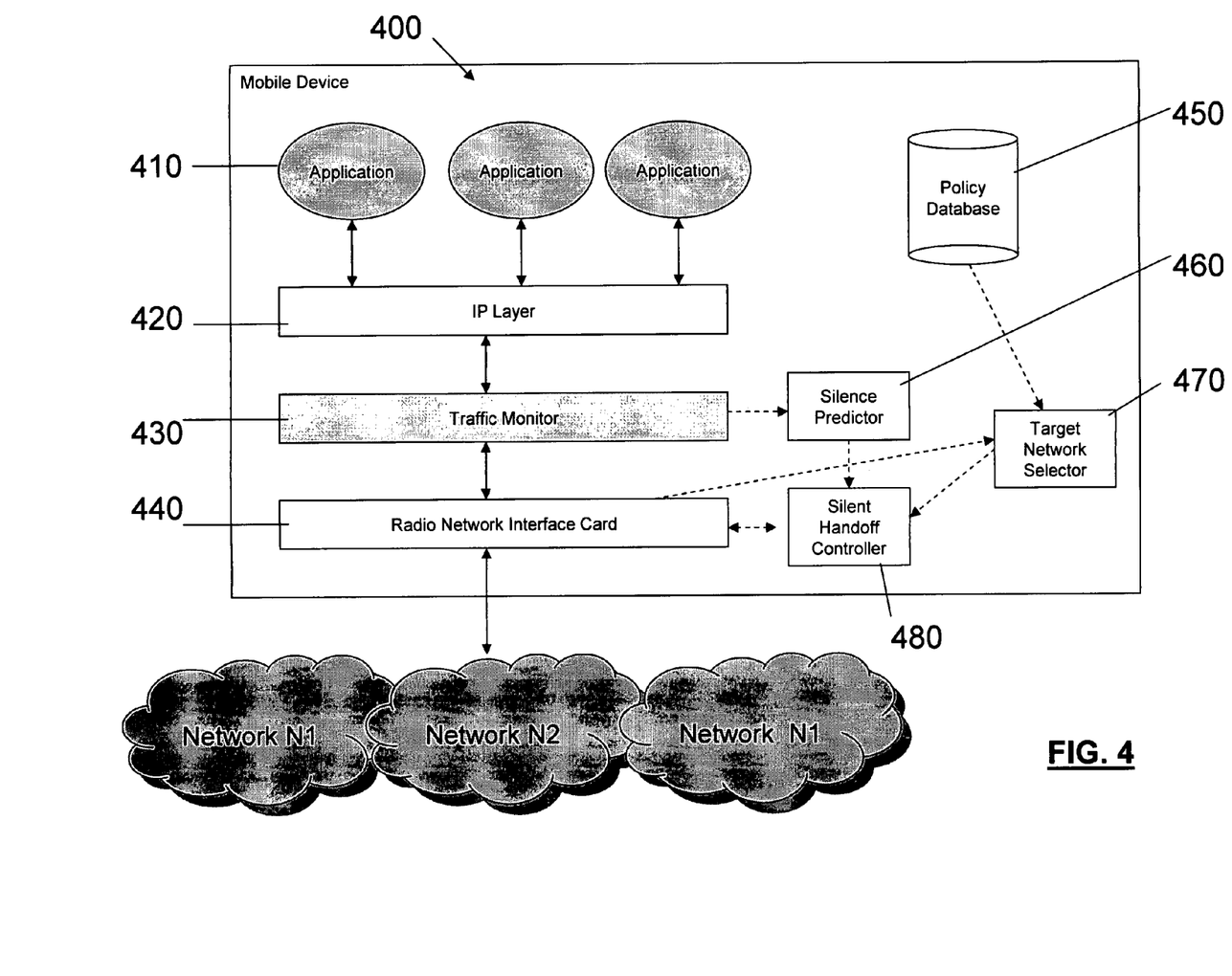
FIG. 4 is an architectural diagram showing components of a mobile device according to some illustrative embodiments of the invention.

FIG. 4 shows an illustrative, and non-limiting, architecture of an exemplary mobile device 400 having silent proactive handoff capabilities. As shown, in some preferred embodiments, the mobile device 400 includes application functionality 410, IP layer functionality 420, a traffic monitor 430, a radio network interface card 440, a policy database 450, a silence predictor 460, a target network selector 470, and a silent handoff controller 480. As also generally indicated in FIG. 4, the radio network interface card of the mobile device can connect to an Access Point or the like within one of the networks N1, N2 and N3 in the illustrated example.

In the illustrated example, the functional entity or component referred to as the silent handoff controller 480 implements the functionality the mobile device performs during an actionable silent period, such as:

establishing connections to a target networks;
discovering network information about the target networks;
obtaining local IP address from the target networks; and/or
performing the require authentications with the target networks.

In various embodiments, the functions incorporated as part of the silent handoff controller 480 could be implemented in hardware, firmware and/or software and/or could also be implemented in, e.g., separate software entities.

In the preferred embodiments, a policy database 450 is provided that maintains user policies regarding how different networks should be used. As some illustrative and non-limiting examples, a policy may specify one or more of the following: a) that a wireless LAN is always preferred over a cellular network; b) that a wireless LAN is always preferred over a cellular network for voice applications; c) that a network with a higher signal strength is always preferred; d) that a network is preferred if it can provide a higher available bandwidth or lower delay; and/or e) other policy specifications.

In the embodiment shown in FIG. 4, a traffic monitor 430 is preferably implemented as a layer between the IP layer 420 and the network device drivers 440. In other embodiments, a variety of other ways of implementing a traffic monitor 430 can be used. By way of example, a traffic monitor could be an application process that obtains traffic information by polling the device drivers or by periodically receiving traffic information from the device drivers.

As indicated above, the various functional components of the mobile device can be implemented in a variety of ways, as would be understood by those in the art based on this disclosure. For example, some or all of the functional components can be implemented in software at the application layer and/or at the kernel layer. Additionally, some or all of the functional components can be implemented in hardware, firmware and/or on micro-chips.

Figure 5:
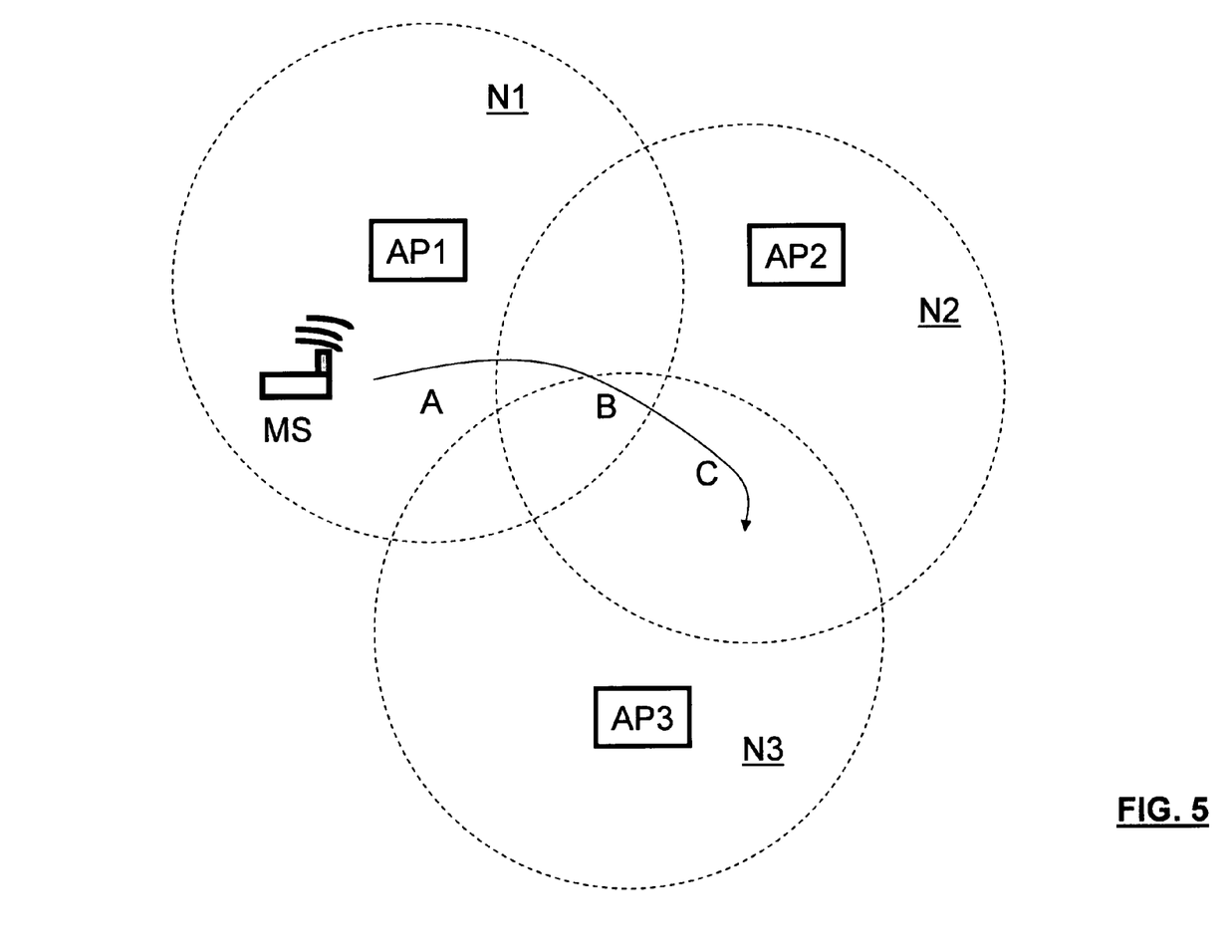
FIG. 5 is an architectural diagram showing movement of a mobile device along a path traversing a plurality of wireless networks for illustrative purposes.

Thus, as depicted in the exemplary system shown in FIG. 5 for illustrative purposes only, a mobile device (e.g., mobile station) MS can begin inside the radio coverage of a first network N1 having an access point AP1 at a position A. Then, upon moving into a position B, the mobile device MS can simultaneously be situated within the radio coverage of a second network N2 and a third network N3, having respective access points AP2 and AP3. As a result, in this region B, the mobile device can perform silent proactive handoff functionality as described above (e.g., performing handoff actions during silent periods while the mobile station is still satisfied by the network N1), such that upon a later movement of the mobile device MS to the position C, a very fast handoff can be achieved (e.g., from network N1 to either of network N2 or N3 in the illustrated exemplary path).

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for performing silent proactive handoff of a mobile device to a target network while the mobile device is using a current network, comprising:

while the mobile device is using the current network to transport application traffic and the current network satisfies the mobile device's requirements, having the mobile device use at least one silent period of an application to temporarily connect to at least one target network to proactively perform at least one handoff action for potential later handoff to the target network.

2. The method of claim 1, wherein said mobile device sends or receives substantially no traffic over the current access network during the at least one silent period.

3. The method of claim 1, further including having the mobile device use the at least one silent period to connect to the target network so that the mobile device receives advertisement messages from the target network.

4. The method of claim 1, further including having the mobile device use the at least one silent period to establish a layer-2 connection or association with the target network for receiving IP-layer or high layer advertisements from the target network.

5. The method of claim 1, further including having the mobile device use the at least one silent period to perform layer-2, layer-3 or application layer authentication with the target network.

6. The method of claim 1, further including having the mobile device perform the following handoff actions during the at least one silent period: a) discovering neighboring network information; b) obtaining a local IP address from the target network; and c) performing authentication with the target network.

7. The method of claim 1, further including having the mobile device determine if the at least one silent period is sufficient to complete one or more handoff action.

8. The method of claim 1, further including having the mobile device determine if the at least one silent period is sufficient to complete one or more handoff action by comparison to a pre-set or a dynamically determined threshold.

9. The method of claim 8, further including comparing different threshold values for different handoff actions.

10. The method of claim 1, further including the mobile device monitoring time periods between packets entering and/or leaving the mobile device over the current access network that the mobile device currently uses to transport its application traffic.

11. The method of claim 1, further including having the mobile device predict an actionable silence period based on said monitoring of time periods and a prediction model.

12. The method of claim 1, further including dynamically estimating at least one actionable silence period threshold for at least one handoff action based on previous times the mobile device took to perform handoff actions, using the at least one threshold and inter-packet times determined from a traffic monitor to detect a next silent period, to predict if this next silent period will be an actionable silent period, and to predict a length of the next actionable silent period.

13. The method of claim 1, further including having said mobile device select a target network to which the mobile may switch to.

14. The method of claim 13, further including when a target network is selected and an actionable silent period is detected, switching the mobile device's layer-2 connection to the target network.

15. The method of claim 1, further including having the mobile device connect successfully to the target network and before a current actionable silent period expires, having the mobile device enter an information discovery phase to listen to the target network's advertisement messages to learn information needed to perform handoffs at different protocol layers to the target network, and if the current actionable silent period has not expired after the information discovery phase, having the mobile device start at least one handoff action.

16. The method of claim 15, further including after having the mobile device start said at least one handoff action, in the event that the current network continues to satisfy the mobile device's requirements, having the mobile device switch its network connection back to the current network.

17. The method of claim 15, further including after having the mobile device start said at least one handoff action, in the event that the current network does not continue to satisfy the mobile device's requirements, having the mobile device perform the remaining handoff steps to finish a handoff.

18. The method of claim 1, further including having said mobile device make a determination as to whether to utilize a silent proactive handoff based on an estimation of the time that the mobile device will be within a candidate network.

19. The method of claim 18, further including having said mobile device make said determination based on one or more of the following parameters: types of user applications; relative speed at which the mobile device is moving; and a predicted size of a candidate network.

20. A mobile device having silent proactive handoff capability, comprising:
   a) a traffic monitor component configured to monitor time periods between packets transmitted to or from the mobile device over a current access network;
   b) a target network selector component configured to select a target network to which the mobile device may potentially switch to when an actionable silence period is detected;
   c) a silence predictor component configured to predict the actionable silence period of an application; and
   d) a silent handoff controller configured to control a silent proactive handoff to a target network during the actionable silent period.

21. The mobile device of claim 20, wherein said silent handoff controller is configured to establish connections to a target network, to discover network information about a target network, to obtain a local IP address for the mobile device from the target network, and to perform authentication with the target network.

* * * * *

UNITED STATES PATENT AND TRADEMARK OFFICE
CERTIFICATE OF CORRECTION

| | | |
|---|---|---|
| PATENT NO. | : 7,502,348 B2 | Page 1 of 1 |
| APPLICATION NO. | : 11/096721 | |
| DATED | : March 10, 2009 | |
| INVENTOR(S) | : Zhang et al. | |

It is certified that error appears in the above-identified patent and that said Letters Patent is hereby corrected as shown below:

On the Title Page, Item (74), under "Attorney, Agent, or Firm", in Column 2, Line 1, delete "Watchstone P+D, PLC;" and insert -- Watchstone P+D, PLLC; --, therefor.

In the Specification

In Column 14, Line 64, delete "the require" and insert -- the required --, therefor.

Signed and Sealed this
Eighteenth Day of November, 2014

Michelle K. Lee
*Deputy Director of the United States Patent and Trademark Office*